(12) United States Patent
Preece et al.

(10) Patent No.: US 7,756,762 B1
(45) Date of Patent: Jul. 13, 2010

(54) METHOD, SYSTEM, AND COMPUTER READABLE MEDIUM FOR PROVIDING AUDIT SUPPORT

(75) Inventors: Richard Neil Preece, San Diego, CA (US); David Andrew Bedell, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 58 days.

(21) Appl. No.: 12/038,745

(22) Filed: Feb. 27, 2008

(51) Int. Cl.
*G06F 17/22* (2006.01)
*G07F 19/00* (2006.01)

(52) U.S. Cl. .............. 705/31; 705/35; 705/30; 705/28

(58) Field of Classification Search ......... 705/30, 705/31
See application file for complete search history.

(56) References Cited

U.S. PATENT DOCUMENTS

2006/0085306 A1* 4/2006 Schulte et al. ............. 705/31
2006/0106690 A1* 5/2006 Williard et al. ............ 705/35
2007/0118445 A1* 5/2007 Hechler .................... 705/30
2009/0112741 A1* 4/2009 Kershner et al. .......... 705/30

OTHER PUBLICATIONS

YouFile, IRS Letters, published May 9, 2007 [online] [retrieved Mar. 9, 2010] [retrieved from: <http://www.you-file.com/audit-letters-a-168.html> ].*

* cited by examiner

*Primary Examiner*—Matthew S Gart
*Assistant Examiner*—R. Shay Glass
(74) *Attorney, Agent, or Firm*—Osha • Liang LLP

(57) ABSTRACT

A method for providing audit support including displaying sample letter images, where each of the sample letter images is associated with one of a number of audit categories. The method further includes receiving a selection of one of the sample letter images from a user, in response to the selection, displaying a detailed sample letter image and a first confirmation question corresponding to the selected sample letter image, and receiving a first response to the first confirmation question from the user, where the first response confirms the user's selection. The method further includes displaying a first audit category description corresponding to the audit category associated with the user's selection, and displaying an action item list associated with the user's selection, where the action item list includes at least one action for the user to take to resolve the audit described by the first audit category description.

20 Claims, 16 Drawing Sheets

US 7,756,762 B1

METHOD, SYSTEM, AND COMPUTER READABLE MEDIUM FOR PROVIDING AUDIT SUPPORT

BACKGROUND

An audit is an evaluation of the validity and reliability of information. Individuals and organizations are entities that may be audited. A typical scenario for an audit in the United States is when the Internal Revenue Service (IRS), which is the United States federal government agency in charge of collecting taxes, audits United States taxpayers. For many of the audits the IRS performs, they initially send an audit letter (i.e., a communication from the IRS) to the entity being audited.

The audit letters the IRS sends have varying appearances of form and content, depending on the type of audit the IRS is conducting and the information the IRS seeks. A taxpayer generally has little knowledge of IRS practices, and as such has a difficult time understanding the content and purpose of the letter. The conventional solution to this problem is for the taxpayer to seek outside support and this typically has meant that they must seek a one-on-one interaction with a person able to help. This type of one-on-one human assistance is costly in that it requires a person to assist every taxpayer who has been audited and is seeking help. If a company would like to provide audit support in this manner, they must hire individuals knowledgeable in the field and/or train people themselves. It takes time and money to scale up support operations and is costly to maintain the human capital necessary to provide one-on-one support.

SUMMARY

In general, in one aspect, the invention relates to a method for providing audit support. The method includes displaying sample letter images, wherein each of sample letter images is associated with one of a number of audit categories, receiving a selection of one of the sample letter images from a user, in response to the selection, displaying a detailed sample letter image and a first confirmation question corresponding to the selected sample letter image, receiving a first response to the first confirmation question from the user, wherein the first response confirms the user's selection, displaying a first audit category description corresponding to the audit category associated with the user's selection, and displaying an action item list associated with the user's selection, wherein the action item list includes at least one action for the user to take to resolve the audit described by the first audit category description.

In general, in one aspect, the invention relates to a method for receiving audit support. The method includes viewing sample letter images within an audit support application, wherein each of the sample letter images is associated with one of a number of audit categories, selecting, by the user, one of the sample letter images, in response to the selection, viewing a detailed sample letter image and a first confirmation question corresponding to the selected sample letter image, providing a first response to the first confirmation question, wherein the first response confirms the user's selection, viewing a first audit category description corresponding to the audit category associated with the user's selection, viewing an action item list associated with the user's selection, wherein the action item lists include at least one action for the user to take to resolve the audit described by the first audit category description, and performing the at least one action.

In general, in one aspect, the invention relates to a computer readable medium comprising instructions executable on a processor for performing a method. The method includes viewing sample letter images within an audit support application, wherein each of the sample letter images is associated with one of a number of audit categories, selecting, by the user, one of the sample letter images, in response to the selection, viewing a detailed sample letter image and a first confirmation question corresponding to the selected sample letter image, providing a first response to the first confirmation question, wherein the first response confirms the user's selection, viewing a first audit category description corresponding to the audit category associated with the user's selection, viewing an action item list associated with the user's selection, wherein the action item lists include at least one action for the user to take to resolve the audit described by the first audit category description and performing the at least one action.

Other aspects of the invention will be apparent from the following description and the appended claims.

DETAILED DESCRIPTION

Figure 1:
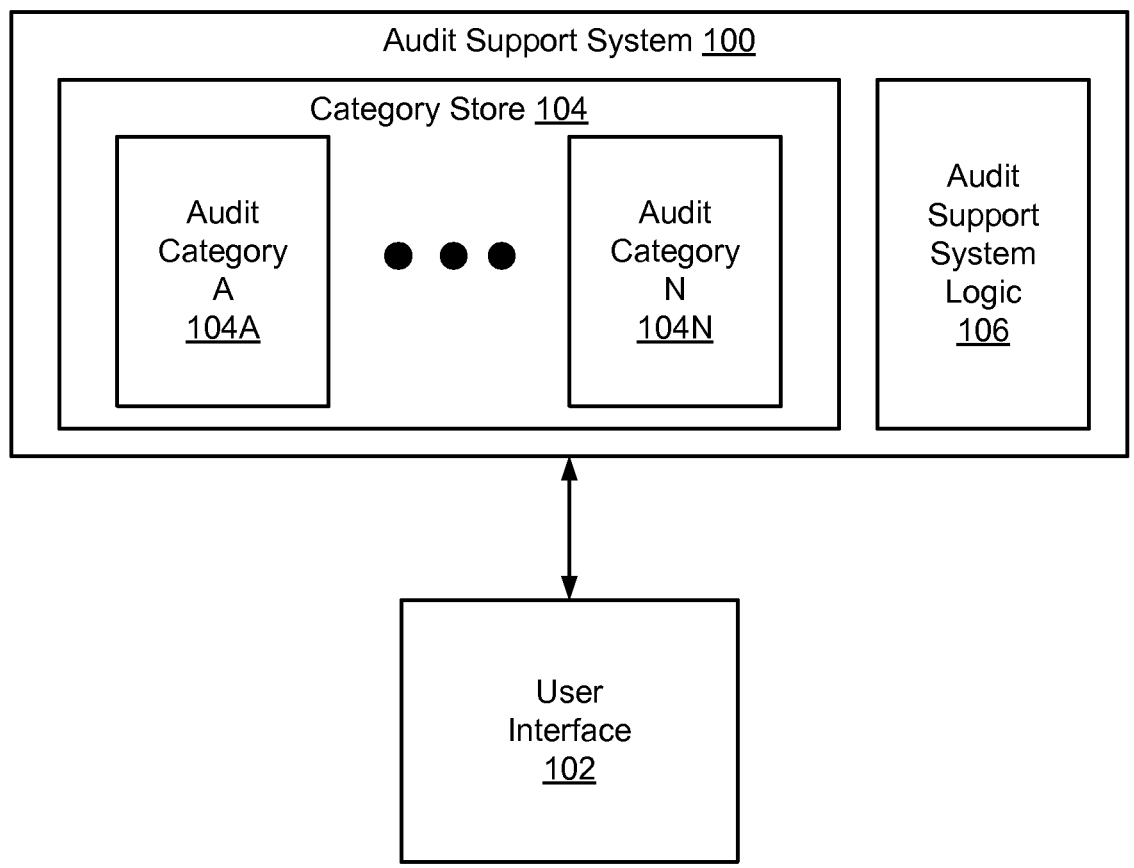
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for providing audit support. More specifically, embodiments of the invention relate to a method and system for enabling a user to determine the category of audit the tax auditing entity is initiating/has initiated and a potential course of action for the user to respond to the audit.

FIG. 1 shows a system in accordance with one or more embodiments of the invention. The system includes an audit support system (100) accessible through a user interface (102). In one or more embodiments of the invention, the audit support system (100) is a web-based application and the user interface (102) is a web browser (or any other user interface configured to interact with the audit support system (100) over a network). In such cases, the audit support system (100) and the user interface (102) (or the system upon which the user interface (102) is executing) communicate over a network (e.g., a wireless network, a wired network, or any combination thereof). Further, the user interface (102) may be executing on any device configured to communicate with the audit support system (100). Examples of such devices include, but are not limited to, a personal computer (e.g., desktop, laptop, tablet personal computer, etc.), a mobile phone, and a personal digital assistance (PDA).

In another embodiment of the invention, the audit support system (100) is an application loaded onto a desktop computer system and the user interface (102) is the graphical user interface provided by the audit support system (100) to enable the user to interact the with the audit support system (100).

In one or more embodiments of the invention, the audit support system (100) includes a category store (104) and audit support system logic (106). The category store (104) includes any persistent storage operatively connected to the audit support system (100) that is configured to store information about audit categories (104A, 104N) (See FIG. 2). The audit support system logic (106) includes functionality to perform the functions of the audit support system (100) discussed below. The audit support system logic (106) may be implemented using hardware, software, or a combination thereof.

Figure 2:
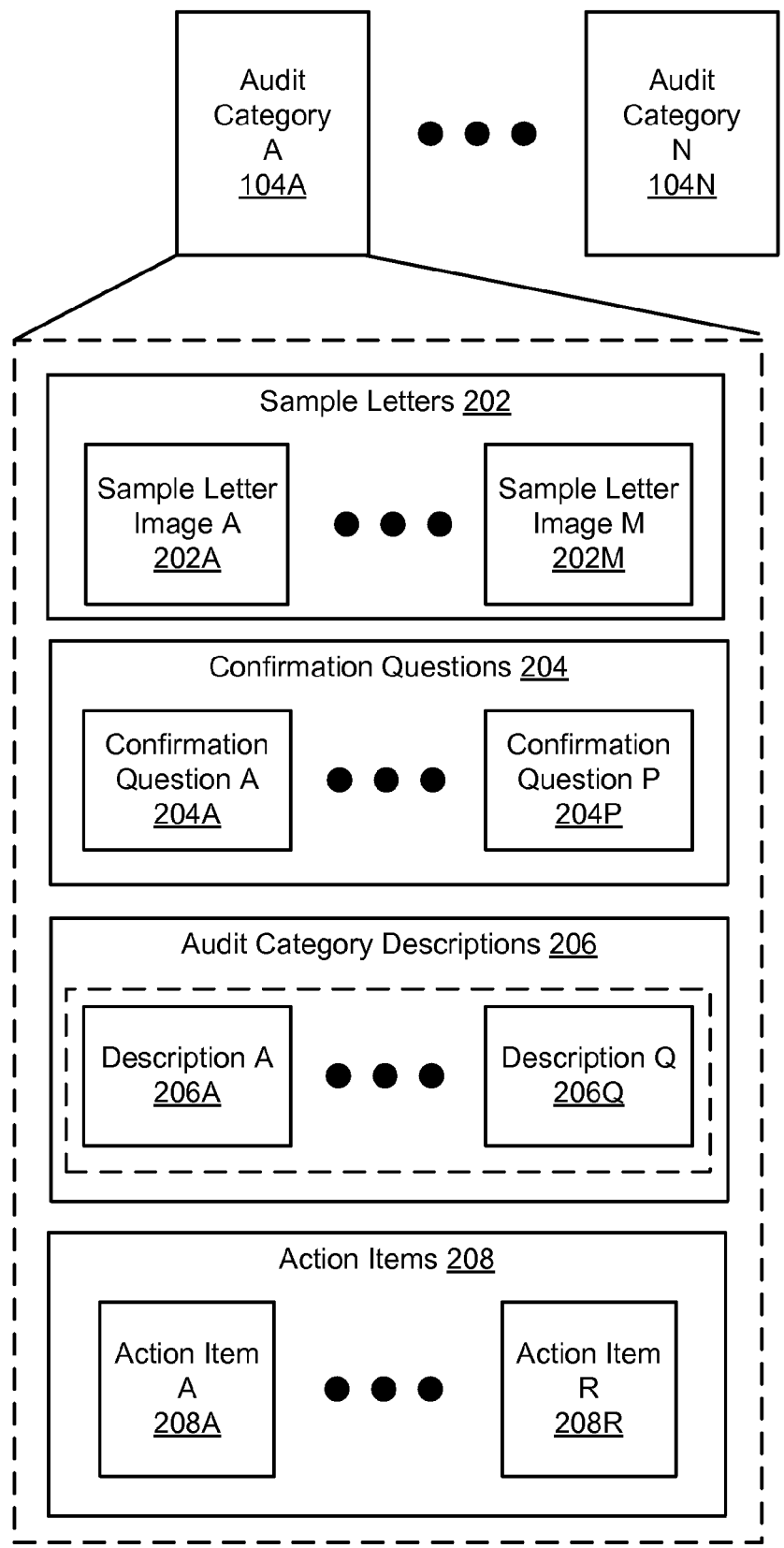
FIG. 2 shows an audit category in accordance with one or more embodiments of the invention.

FIG. 2 shows an audit category in accordance with one or more embodiments of the invention. In one or more embodiments of the invention, each audit category corresponds to a type of audit that a tax auditing entity may perform. The audit categories may be specified based on designation specified by the tax auditing entity, based on designation specified by designers (or related individuals) of the audit support system, or a combination thereof. Further, each audit category may include audit sub-categories, which correspond to specific sub-types of audits within a broader audit category.

Turning to FIG. 2, as discussed, the category store (104 in FIG. 1) includes one or more audit categories (104A, 104N). Further, each audit category includes one or more sample letters (202), one or more confirmation questions (204), one or more audit category descriptions (206), and one or more action items (208). Each of the aforementioned components associated with the audit category (104A, 104N) is discussed below.

In one or more embodiments of the invention, the sample letters (202) component includes one or more sample letter images (202A, 202M). Each of the sample letter images (202A, 202M) corresponds to an image of a letter associated with the audit category (or audit sub-category). The sample letter images (202A, 202M) may include both thumbnail images and detailed images of the letters. The sample letter images (202A, 202M) may be correspond to a full letter image or partial selections of the letter content. In one or more embodiments of the invention, the detailed images correspond to larger images which include greater level of detail than is discernable from a thumbnail image. The letters shown in the sample letter images (202A, 202M) may correspond to an actual audit letter received from the tax auditing entity or may be a sample audit letter which is includes the same (or similar) content and format as an actual audit letter received from the tax auditing entity. In one or more embodiments of the invention, if the sample letter image is an actual audit letter, all personal information is removed from or otherwise redacted in the sample letter image.

Regardless of whether the sample letter image is of an actual audit letter received from the tax auditing entity or of a sample audit letter, the sample letter image includes certain characteristic (e.g., format, title, form identification number, layout, etc.) which identifies (or otherwise associates) the letter shown in the sample letter image with a particular audit category (or sub-category). Those skilled in the art will appreciate that such characteristics may not be readily discernable from the thumbnail images. In one or more embodiments of the invention, there may be one thumbnail image and a corresponding detailed image for each of the letters (actual or sample).

In one or more embodiments of the invention, the confirmation questions (204) component includes one or more confirmation questions (204A, 204P). In one or more embodiments of the invention, each of the confirmation questions (204A, 204P) may be associated with one or more of the sample letters (202). One or more of confirmation questions (204A, 204P) may request the user to confirm or deny whether the selected sample letter image they are viewing corresponds to an actual audit letter they have received from the tax auditing entity. Further, one or more of confirmation questions (204A, 204P) may request the user to enter information from the audit letter they have received from the tax auditing entity in order for the audit support system (100) to determine whether the user has selected the correct audit category (or subcategory). In one or more embodiments of the invention, if the user is requested to enter information from the audit letter, the expected input from the user is stored with (or associated with) the confirmation question.

In one or more embodiments of the invention, the audit category description (206) component includes one or more audit category descriptions (206A, 206Q). Each audit category description (206A, 206Q) defines the audit category or sub-category (or a portion thereof). Further, each audit category description (206A, 206Q) may vary in the level of specificity in the description. For example, one audit category description may only describe the overall audit category, while another audit category description may describe, in detail, a specific portion of the audit category or a specific audit sub-category.

In one or more embodiments of the invention, the action items (208) component includes one or more action items (208A, 208R). Each of the action items (208A, 208R) corresponds to one or more actions a user may take in order to move closer to completing the audit. In one or more embodiments of the invention, a given action item (208A, 208R) (or set of action items) may be associated with one or more audit categories (or subcategories). The actions items (208A, 208R) may vary based on the audit category and sub-category as well as the point in audit in which the action item is presented. Examples of action items include, but are not limited to, (i) locating the user's receipts, (ii) locating the user's previous tax returns, (iii) contacting the tax auditing entity, (iv) contacting a tax professional to aid the user in the audit, (v) organizing the tax related documentation, (vi) creating copies of specific information, and (vii) writing letters. The action items (208A, 208R) may also include helpful strategies for dealing with the audits within the audit category, such as writing tips, maintaining credibility, proving deductions, tips for common issues, and a summary of what comes next.

Those skilled in the art will appreciate that while the above discussion describes what information is associated with a given audit category, the above discussion does not limit the manner in which the information is maintained. Rather, the aforementioned information may be maintained using any data structure provided that such information may be obtained, directly or indirectly, based on the audit category or sub-category.

Figure 3:
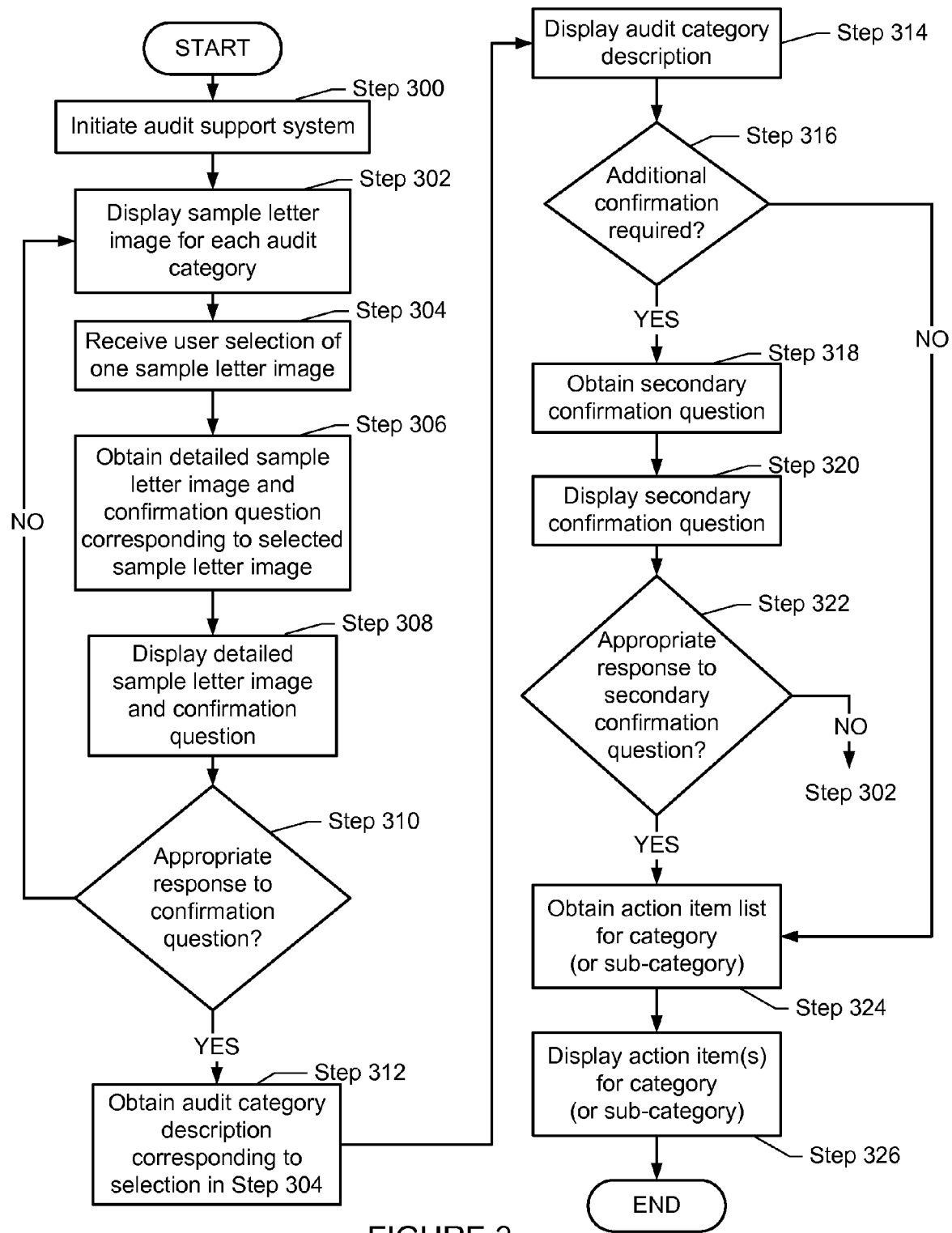
FIGS. 3 and 4 show flowcharts in accordance with one or more embodiments of the invention.

FIG. 3 shows a flowchart in accordance with one or more embodiments of the invention. In one or more embodiments of the invention, one or more of the steps shown in FIG. 3 may be omitted, repeated, and/or performed in a different order. Accordingly, embodiments of the invention should not be considered limited to the specific arrangement of steps shown in FIG. 3.

Turning to FIG. 3, in Step 300, the audit support system is initiated. In one or more embodiments of the invention, initiating the audit support system (100) may involve accessing the network (e.g., the Internet) or initiating an executable program. In Step 302, sample letter images of each audit category (or at least a set of audit categories) are displayed to the user via the user interface. In one or more embodiments of the invention, the user may initially be presented with thumbnail images. Further, the aforementioned sample letter images may be displayed along with a request for the user to select one of the sample letter images that most closely matches the audit letter they received from the tax auditing entity. In Step 304, the audit support system receives a selection of one of the sample letter images displayed in Step 302. In Step 306, a detailed sample letter image, which corresponds to the selected sample letter image in Step 304, is obtained along with a confirmation question corresponding to the selected sample letter image. In Step 308, the detailed sample letter image (or portion thereof) and the confirmation question are displayed to the user. In Step 310, a determination is made about whether an appropriate response to the confirmation question was received from the user (i.e., did the user confirm that the detailed sample letter image of the sample letter corresponds to the audit letter the user received from the tax auditing entity). If an appropriate response is not received, then the process proceeds to Step 302. In Step 312, when an appropriate response is received from the user, an audit category description corresponding to the selection in Step 304 is obtained. In Step 314, the audit category description is displayed to the user via the user interface.

In Step 316, a determination is made about whether additional confirmation is required. If additional confirmation is not required, the process proceeds to Step 324. In Step 318, when additional confirmation is required, another confirmation question is obtained. In Step 320, the additional confirmation question is displayed to the user. In Step 322, a determination is made about whether an appropriate response to the additional confirmation question was received from the user (e.g., did the user input an appropriate document identification number, where the document number entered by the user is located on the audit letter the user received from the tax auditing entity). If an appropriate response is not received, the process proceeds to Step 302. In Step 324, if an appropriate response is received, a corresponding action item list (which includes corresponding action items (208 in FIG. 2) is obtained for the audit category or audit sub-category. In one or more embodiments of the invention, there may be multiple appropriate answers to the additional confirmation question. For example, the different document identification numbers may be entered by the various users, where each document number is associated with a particular audit sub-category. In such cases, the content of action item list obtained in Step 324 may be dependent on the response provided by the user prior to Step 322. In Step 324, the action item list is displayed to the user.

Those skilled in the art will appreciate that FIG. 3 shows only one or more embodiments of the invention and any of the confirmation steps above (Steps 306 through 322) may be repeated, left out, or placed in a different order to achieve the end result. For example, it may not be necessary to have confirmation questions, as in Step 308 and Step 320. In such cases, the user may be immediately presented with a display of an action item for the audit category or sub-category (Step 326) following a response to the confirmation question (Step 310). Alternatively, the user may be directed to different displays of action item lists (Step 326) immediately after selecting one sample letter image (Step 304). The content of the action item lists and confirmation questions may be the same or different for each audit category or sub-category and the confirmation questions may direct the user to specify a sub-category within the category or other sub-categories within the sub-category.

Figure 4:
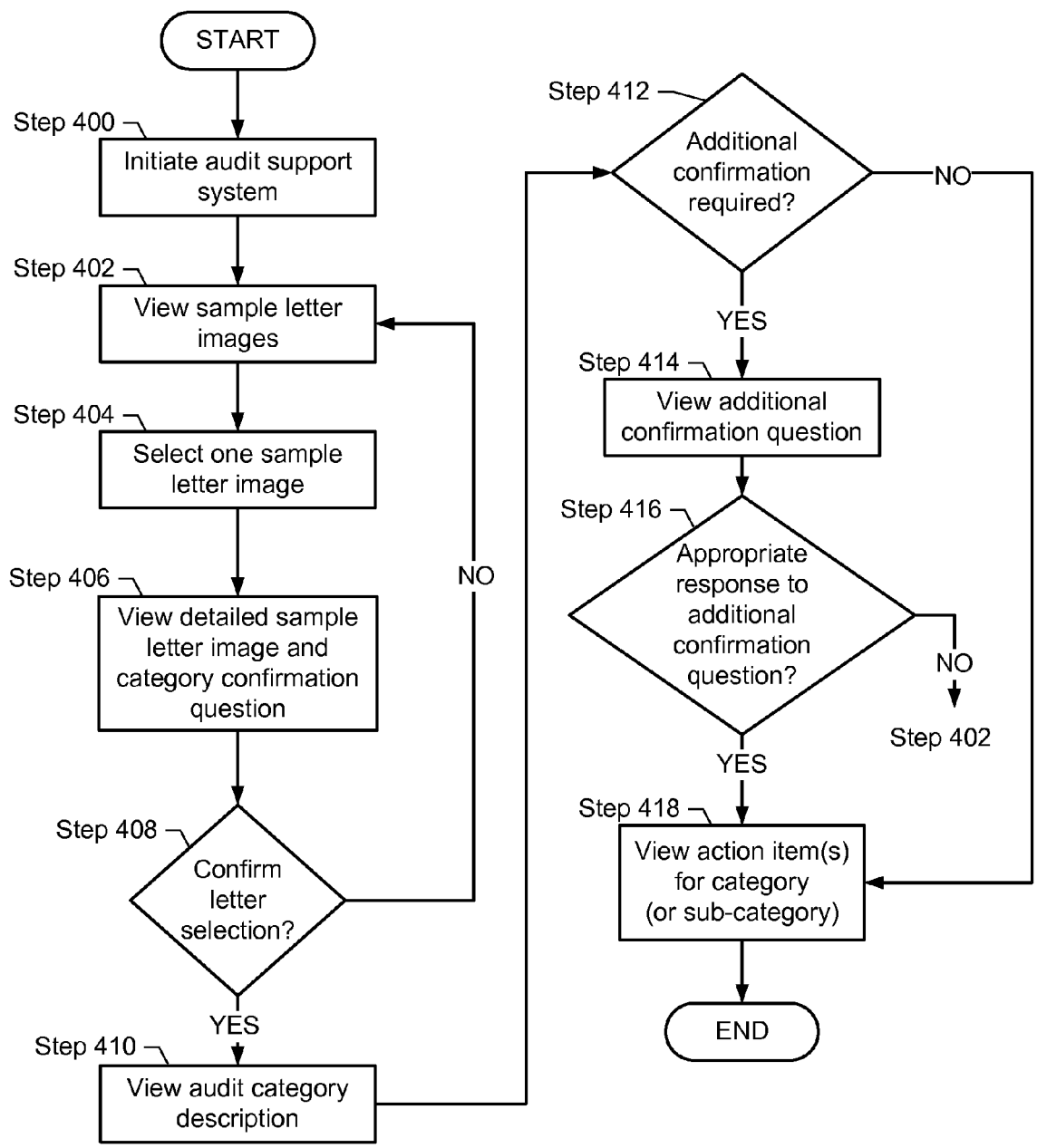

FIG. 4 shows a flowchart of a method for in accordance with one or more embodiments of the invention. In one or more embodiments of the invention, one or more of the steps shown in FIG. 4 may be omitted, repeated, and/or performed in a different order. Accordingly, embodiments of the invention should not be considered limited to the specific arrangement of steps shown in FIG. 4.

Turning to FIG. 4, in Step 400, the user initiates audit support. As discussed above, initiating the audit support system (100) may involve accessing a network or initiating an executable program. In Step 402, the user views sample letter images. These sample letter images correspond to various audit categories, as discussed above in FIG. 2. In Step 404, the user selects one sample letter image based on their assessment of the similarity of the sample letter in the sample letter image to the audit letter they received from the tax auditing entity. In Step 406, the user views a detailed sample letter image and a confirmation question. In Step 408, a determination is made about whether the user confirmed that the detailed sample letter image corresponds to the audit letter the user received from the tax auditing entity. If the user does not confirm that the detailed sample letter image corresponds to the audit letter the user received from the tax auditing entity then the process proceeds to Step 402. In Step 410, if the user confirms that the detailed sample letter image corresponds to the audit letter the user received from the tax auditing entity, then the user is presented with a corresponding audit category description. In Step 412, a determination is made about whether additional confirmation is required. If additional confirmation is not required, the process proceeds to Step 418. In Step 414, when additional confirmation is required the user is presented with an additional confirmation question. In Step 416, a determination is made about whether the user provided an appropriate response to the additional question. If an appropriate response is not provided by the user, then the process proceeds to Step 402. In Step 418, when an appropriate response is provided, the user is presented with an appropriate action item list for the category or sub-category.

Those skilled in the art will appreciate that FIG. 4 shows only one or more embodiments of the invention and any of the confirmation steps above (Steps 406 through 416) may be repeated, left out, or placed in a different order to achieve the end result. For example, it may not be necessary to have confirmation questions, as in Step 406 and Step 414. In such cases, the user may be immediately presented with an action items list for the audit category or sub-category (Step 418) following a response to the confirmation question (Step 406). Alternatively, the user may be presented with different action item lists for each category (Step 418) immediately after selecting sample letter images (Step 402). The content of the action item list and confirmation questions may be the same or different for each audit category or sub-category and the confirmation questions may direct the user to specify a sub-category within the category or other sub-categories within the sub-category.

Figure 5:
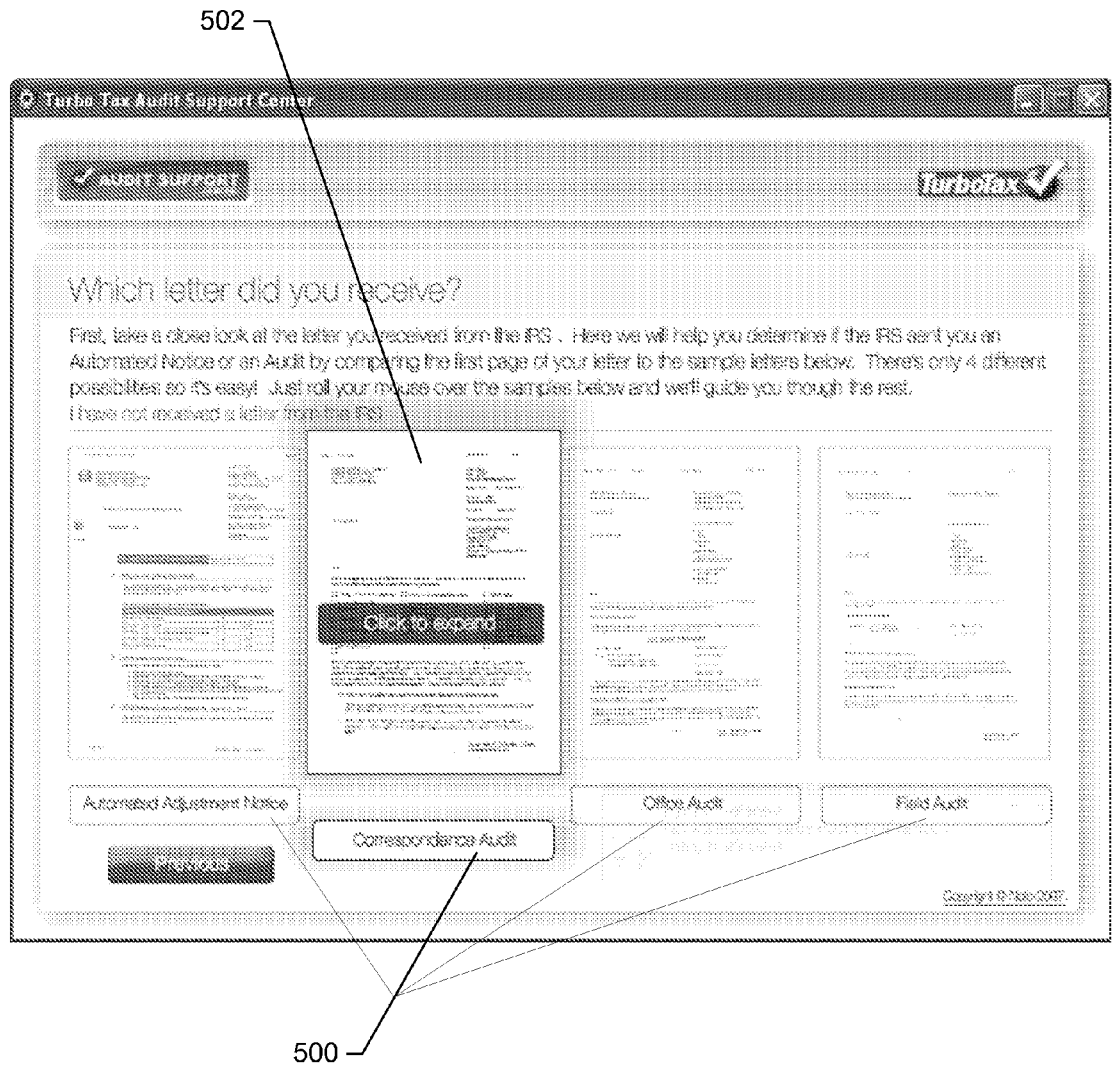
FIGS. 5-10 show a first example in accordance in accordance with one or more embodiments of the invention.
Figure 6:
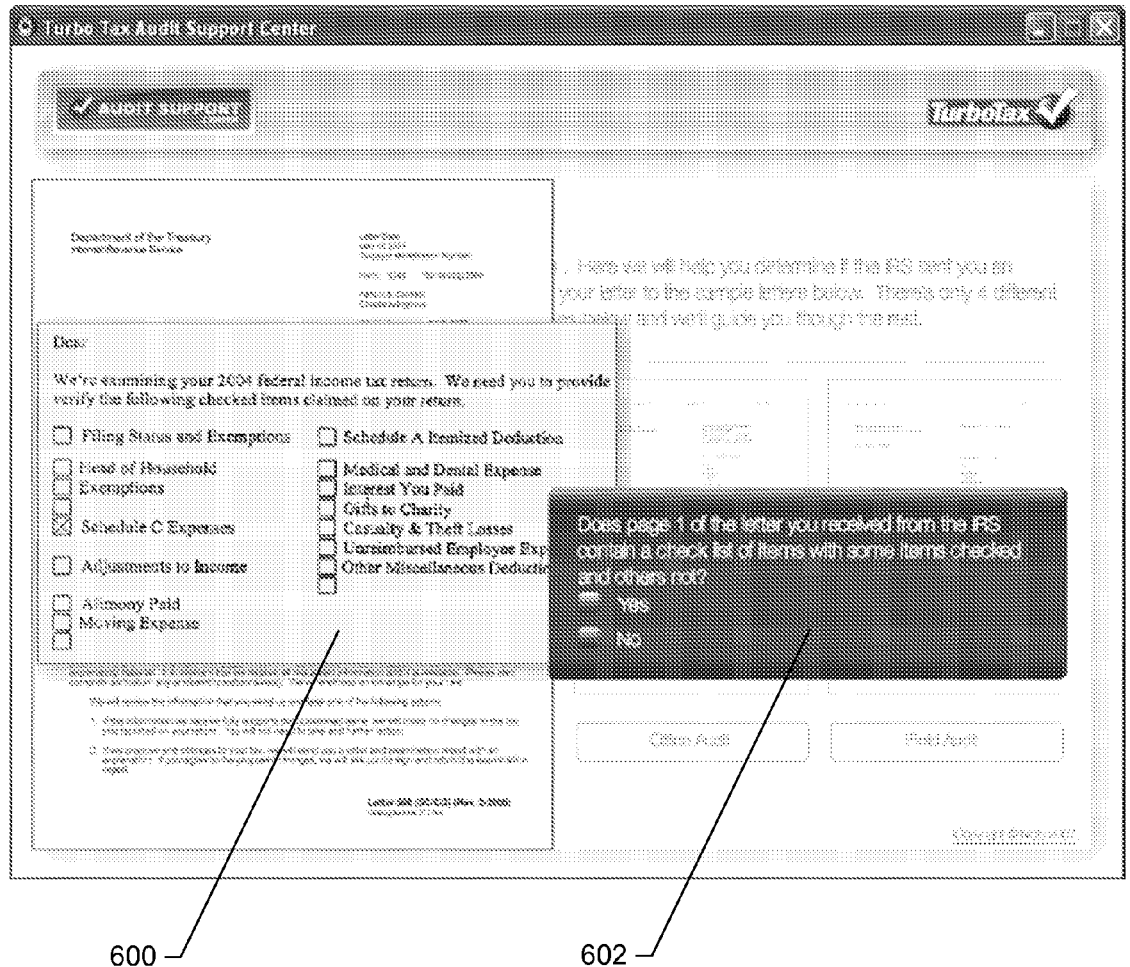

FIGS. 5-10 show a first example in accordance with one or more embodiments of the invention. The example is not intended to limit the scope of the invention. Turning to FIGS. 5-10, FIG. 5 shows a screenshot of sample letter images. In this example, the taxpayer initiates the Audit Support System (100) to determine what type of audit letter they have received. This screenshot shows sample letters that may have been received from the IRS (e.g., a tax auditing entity) when a taxpayer has been (or about to be) audited. As shown in this example, the user views sample letter images (500), where each sample letter image is similar in form to the type of letter sent by the IRS for each category of audit. In this example, as the user rolls their mouse over each sample letter image (which appear as thumbnail images) the image is displayed in the foreground and the option for the user to click to select and expand the image is provided (502). Once the user selects a specific sample letter image, they are directed to more detailed information, as shown in FIG. 6.

FIG. 6 shows a screenshot of a detailed sample letter image and a confirmation question. As shown in this example, a specific portion of the sample letter image is expanded for easier viewing (600). The selection of what content to expand depends on the content specific to that type of audit category sample letter image. Here, the expanded section is associated with the type of audit category to assist the user in identifying whether they made the appropriate selection. In this example, the expanded portion is an example of a checklist typically included in this type of audit category, with some items checked. The user may view this expanded content to determine whether the expanded content matches the corresponding portion on the audit letter they received. The user also receives a confirmation question asking the user to confirm whether the expanded content matches the corresponding portion on the audit letter they received (602). In this example, the user may answer YES or NO answer.

Figure 7:
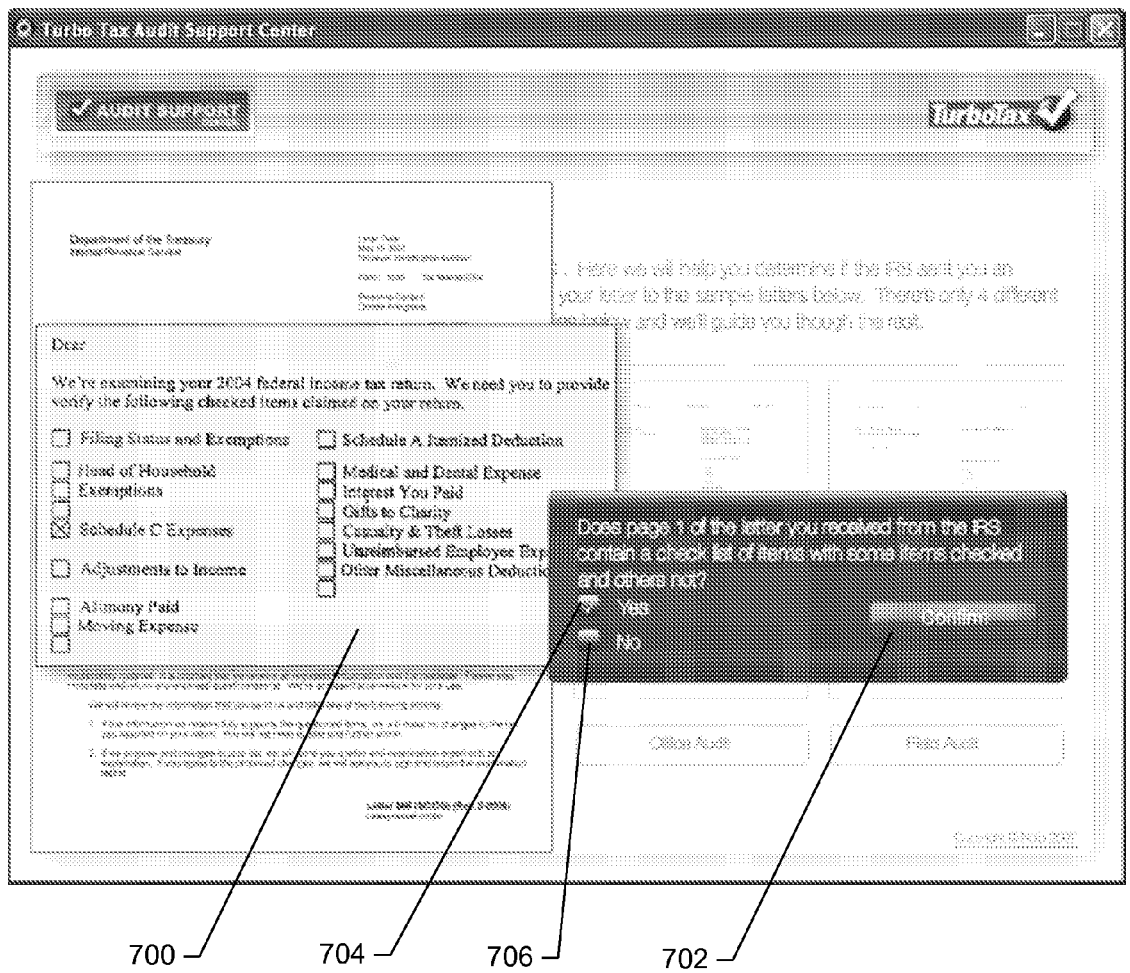

FIG. 7 shows a screenshot of a detailed sample letter image and an answer to the confirmation question. After viewing the detailed screenshot with the expanded content as discussed in FIG. 6, the user must answer the confirmation question (700). Once a checkbox is selected, the user is provided with a confirmation button allowing them to proceed to the next step (702). If the user selects "YES" (704) to the confirmation question, they are directed to additional confirmation questions and more detailed information regarding the audit category they have selected, as discussed in FIG. 8. If the user selects "NO" (706) to the confirmation question, they may return to viewing the sample letter images as shown in FIG. 5.

Figure 8:
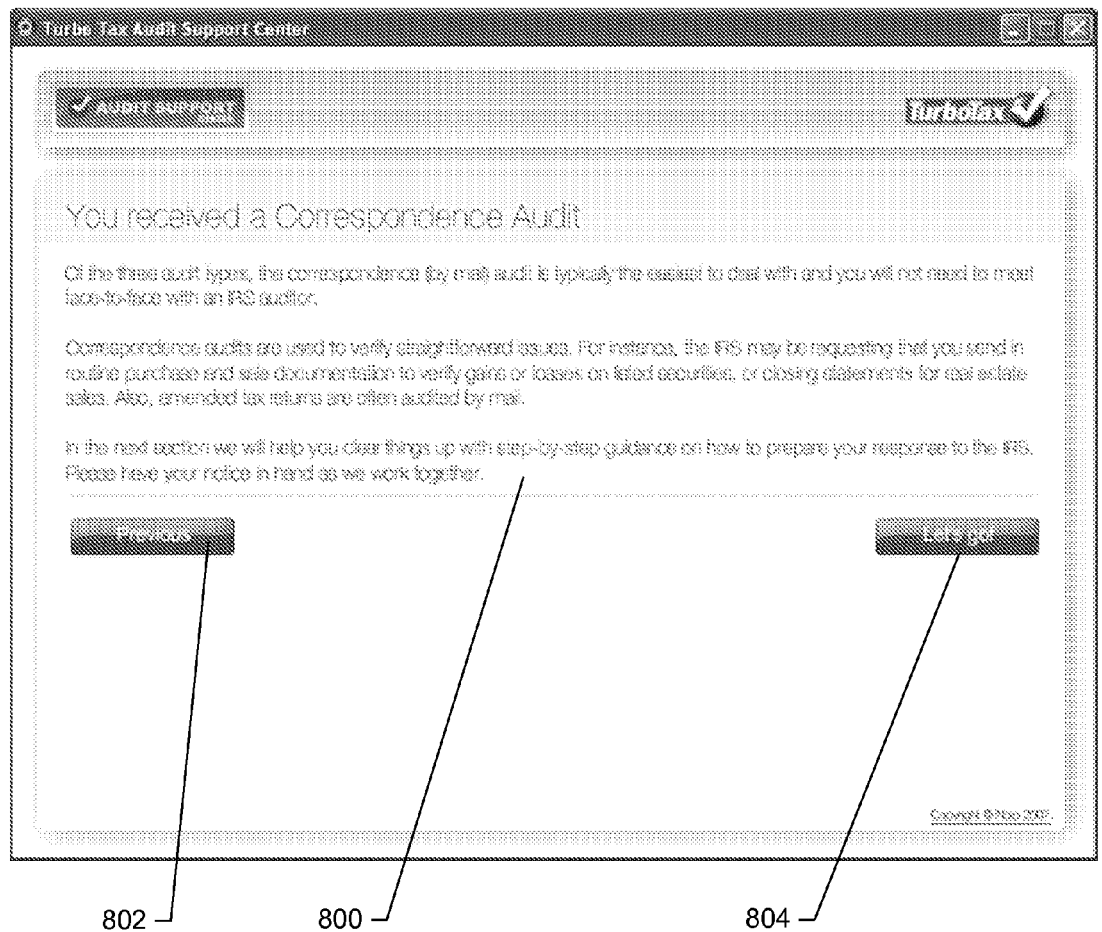

FIG. 8 shows a screenshot of an audit category description corresponding to the user selection and providing an additional confirmation question. In this example, the audit category description (800) displays additional information about the chosen audit category, namely the ease of dealing with this type of audit, the purpose of this type of audit, and the next step that will occur in the program. If the user determines that this is not the correct audit category, or they want to start over, they may select the button marked "Previous" (802) to be directed back to the screen with the sample letter images (FIG. 5). If the user would like to continue to the next step, they may select the "Let's go!" button (804) to reach an additional confirmation question, discussed in FIG. 9.

Figure 9:
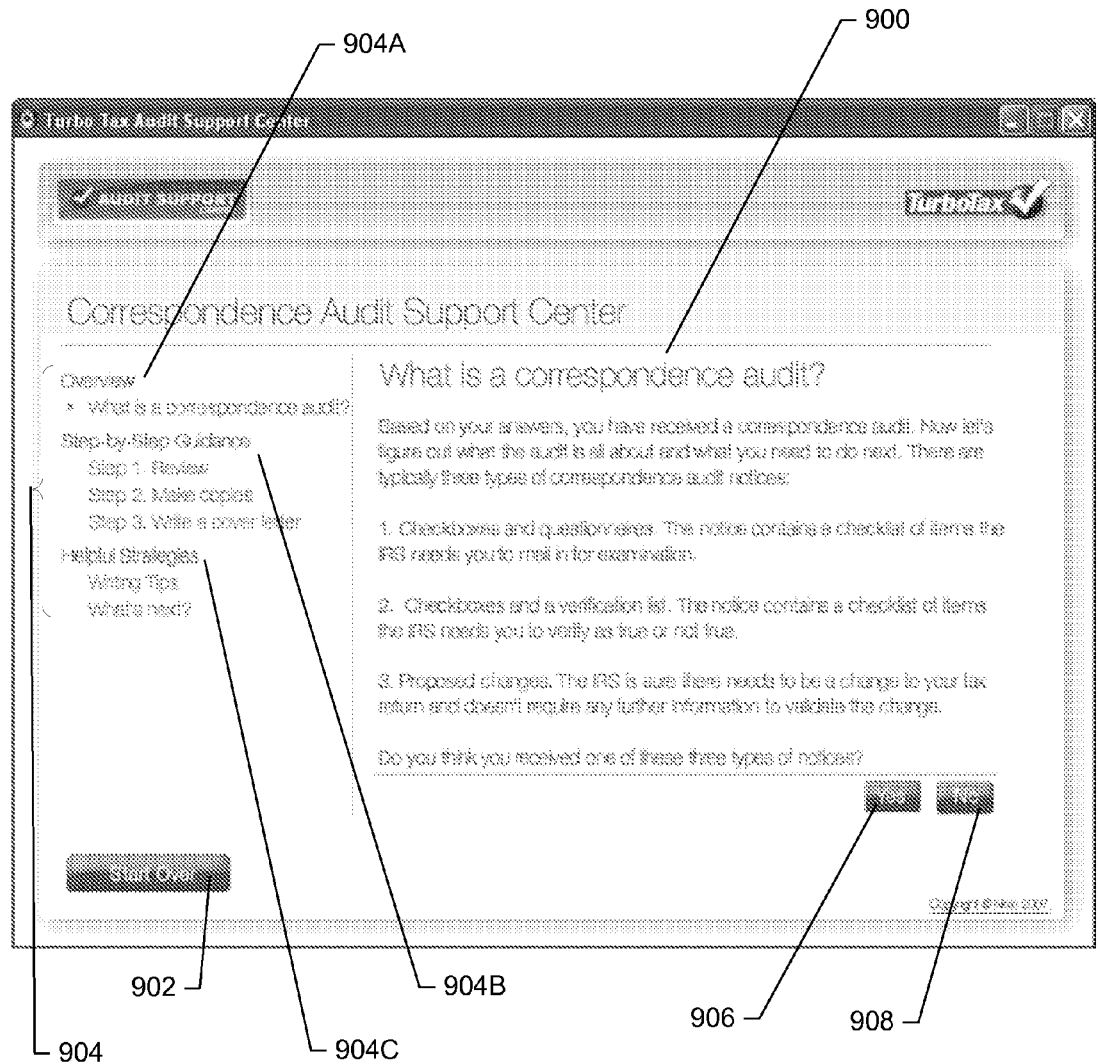

FIG. 9 shows a screenshot of an additional confirmation question associated with audit sub-categories. In this example, the user is provided with an additional confirmation question which provides information about the sub-categories of audits within this audit category (900) and allows the user to confirm whether they would like to continue in this audit category. Each audit sub-category is described, allowing the user to determine which of the audit sub-categories matches the audit described in the audit letter they received. The additional confirmation question provides the user a chance to confirm whether they would like to proceed with this audit category based on the additional information on the sub-categories (900). The user may also select the "Start Over" button (902) to return to the screen with the sample letter images (FIG. 5). If the user selects the "No" button (908) to the additional confirmation question, an action items list corresponds to the selection is displayed, discussed further in FIG. 10. If the user selects the "Yes" button (906) to the additional confirmation question, they are allowed to proceed with the action items shown in FIG. 9 at 904. The list of action items (904) provides additional information to the user corresponding with the audit category selected. In this example, the action items (904) include an overview of the audit type (904A), step-by-step guidance (904B), and helpful strategies (904C).

Figure 10:
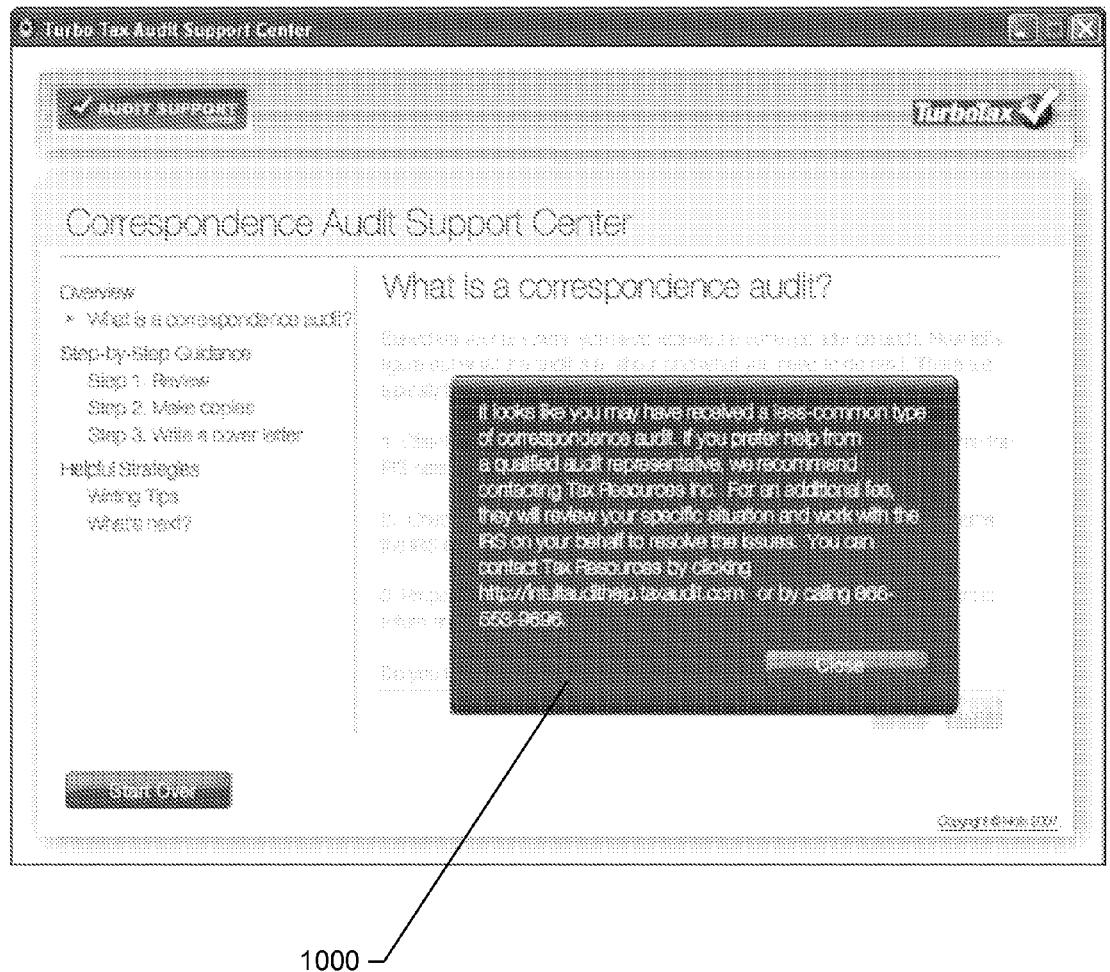

FIG. 10 shows a screenshot of an action item list associated with the user's selection. This is an example of an action items list (1000) the user is presented with after selecting "No" to the additional confirmation question in FIG. 9. The action items list (1000) provides additional information about the sub-category of audit the user may have received based on the responses to the previous confirmation questions. In this example, the user selected "No" (906) to confirm that their audit type was one of the sub-categories described (900). The subsequently presented action items list (1000) is tailored to respond to this response. The action items list (1000) also provides guidance to the user for future actions.

Figure 11:
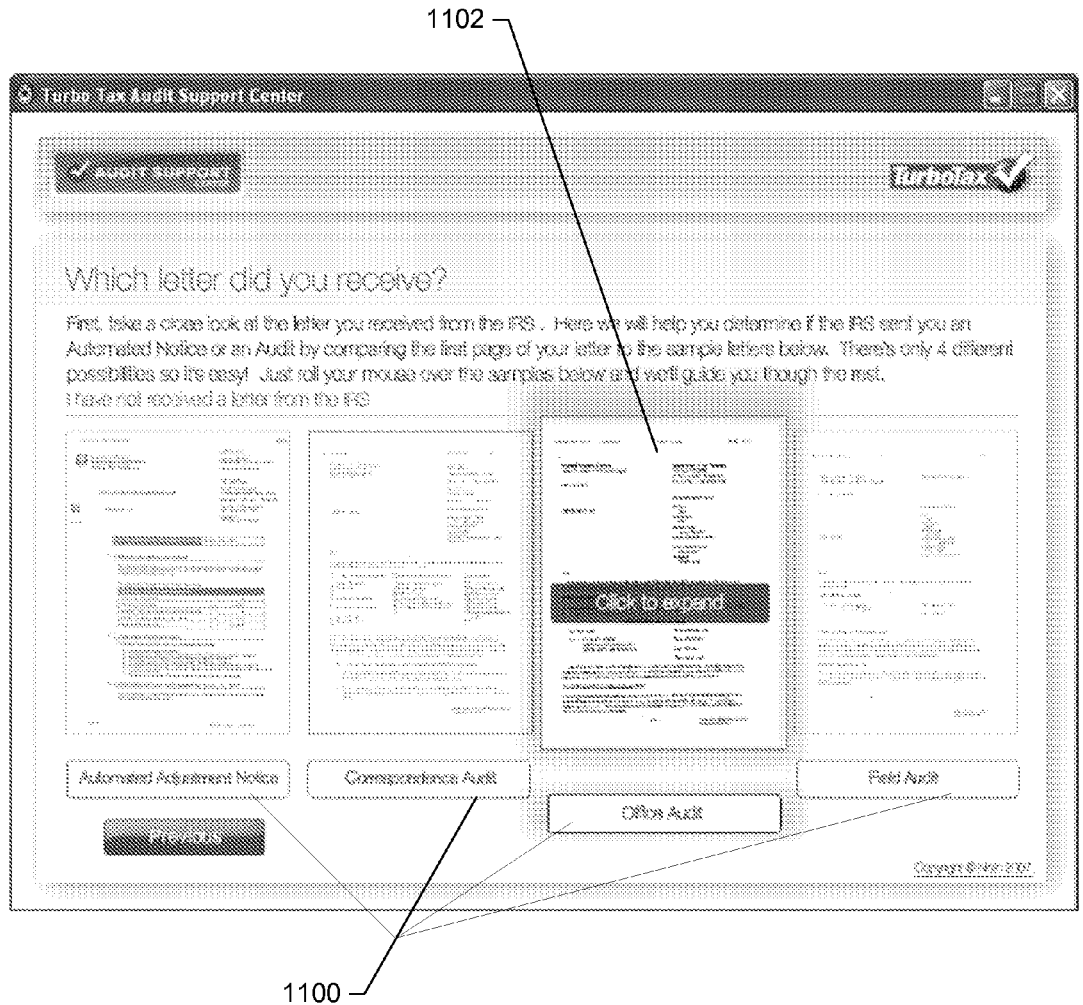
FIGS. 11-16 show a second example in accordance in accordance with one or more embodiments of the invention.
Figure 12:
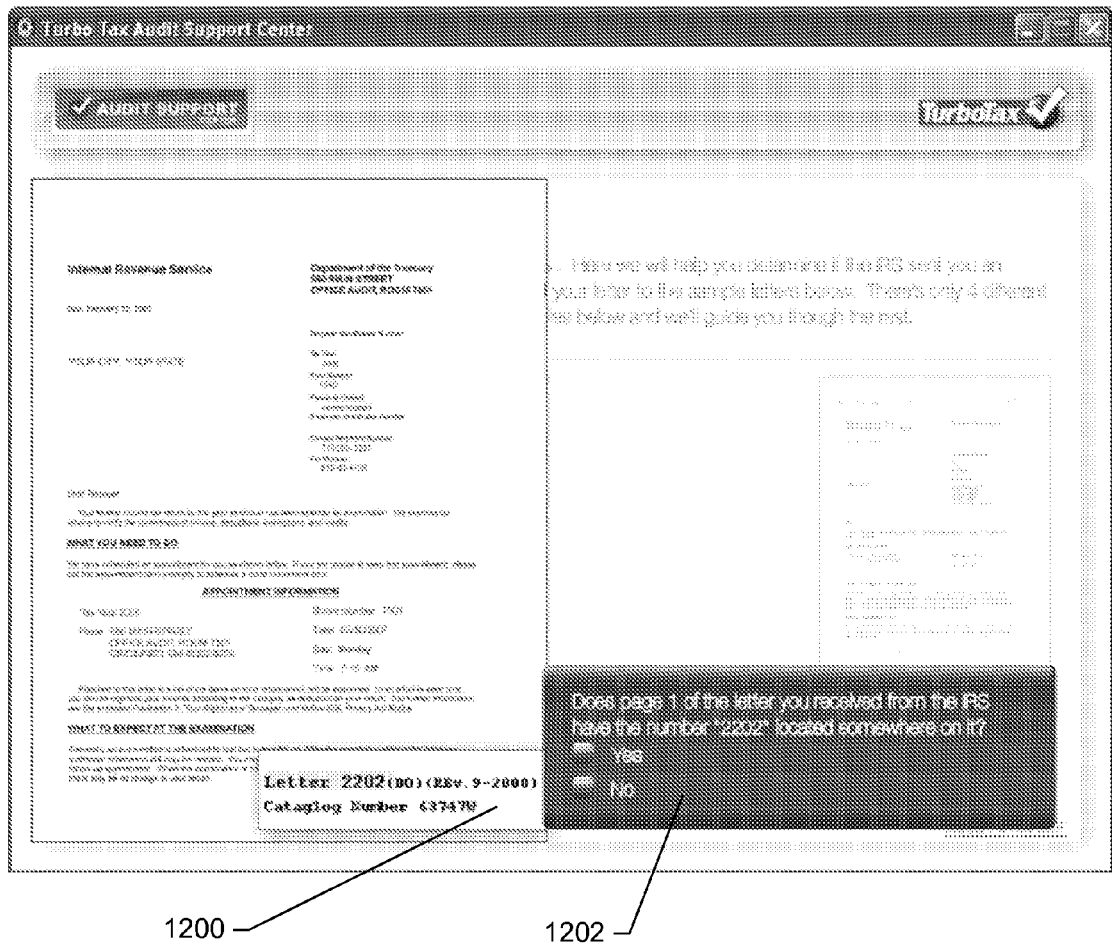

FIGS. 11-16 show a second example in accordance with one or more embodiments of the invention. The example is not intended to limit the scope of the invention. Turning to FIGS. 11-16, FIG. 11 shows a screenshot of sample letter images. In this example, the taxpayer initiates the Audit Support System (100) to determine what type of audit letter they have received. This screenshot shows sample letters that may have been received from the IRS when a taxpayer has been audited. As shown in this example, the user views sample letter images (1100), where each sample letter image is similar in form to the type of audit letter sent by the IRS for each category of audit. In this example, as the user rolls their mouse over each sample letter image, the image is displayed in the foreground and the option for the user to click to select and expand the image is provided (1102). By viewing the expanded sample letter images, the user may select one that appears similar to the audit letter they received from the IRS. Once the user selects a specific sample letter image, they are directed to more detailed information, as shown in FIG. 12.

FIG. 12 shows a screenshot of a detailed sample letter image and a confirmation question. As shown in this example, a specific portion of the sample letter image is expanded for easier viewing (1200). The selection of what content to expand depends on the content specific to that type of audit category of the sample letter image. In this example, the expanded section is a specific numeric sequence. By viewing this numeric sequence and comparing it to the audit letter they received from the IRS, the user is able to identify whether this is the appropriate selection. The user also receives a confirmation question asking the user to confirm whether the information displayed in the expanded content (1202) corresponds to the information on the audit letter they received from the IRS. In this example, the user may provide a YES or NO answer.

Figure 13:
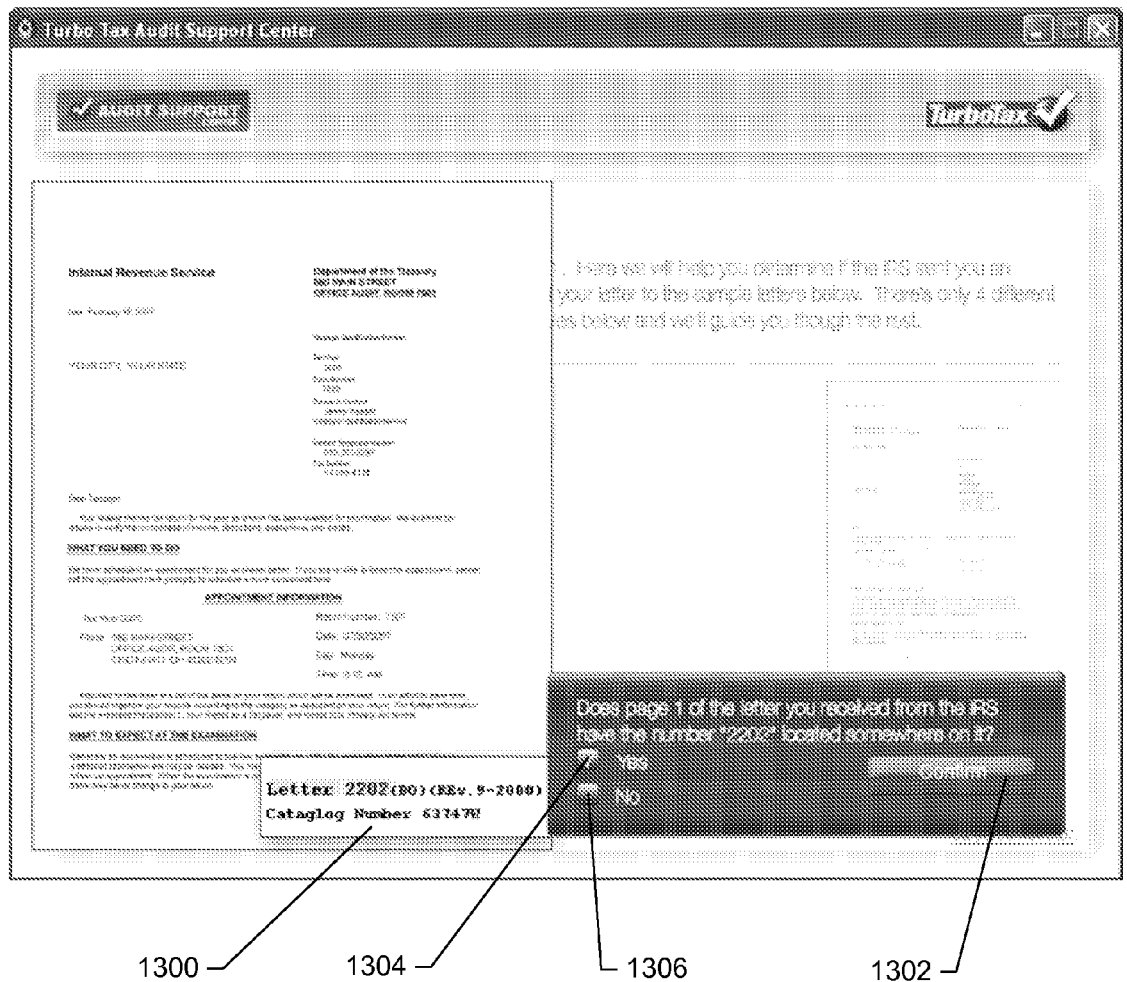

FIG. 13 shows a screenshot of a detailed sample letter image and an answer to the confirmation question. After viewing the detailed screenshot with the expanded content as discussed in FIG. 12, the user must answer the confirmation question to confirm whether the information displayed in the expanded content (1300) corresponds to the information on the audit letter they received from the IRS. Once a checkbox is selected, the user is provided with a confirmation button allowing them to proceed (1302). If the user selects "YES" (1304) to the confirmation question, they are directed to additional confirmation questions and more detailed information regarding the audit category they have selected, as discussed in FIG. 14. If the user selects "NO" (1306) to the confirmation question, they may return to viewing the sample letter images as shown in FIG. 11.

Figure 14:
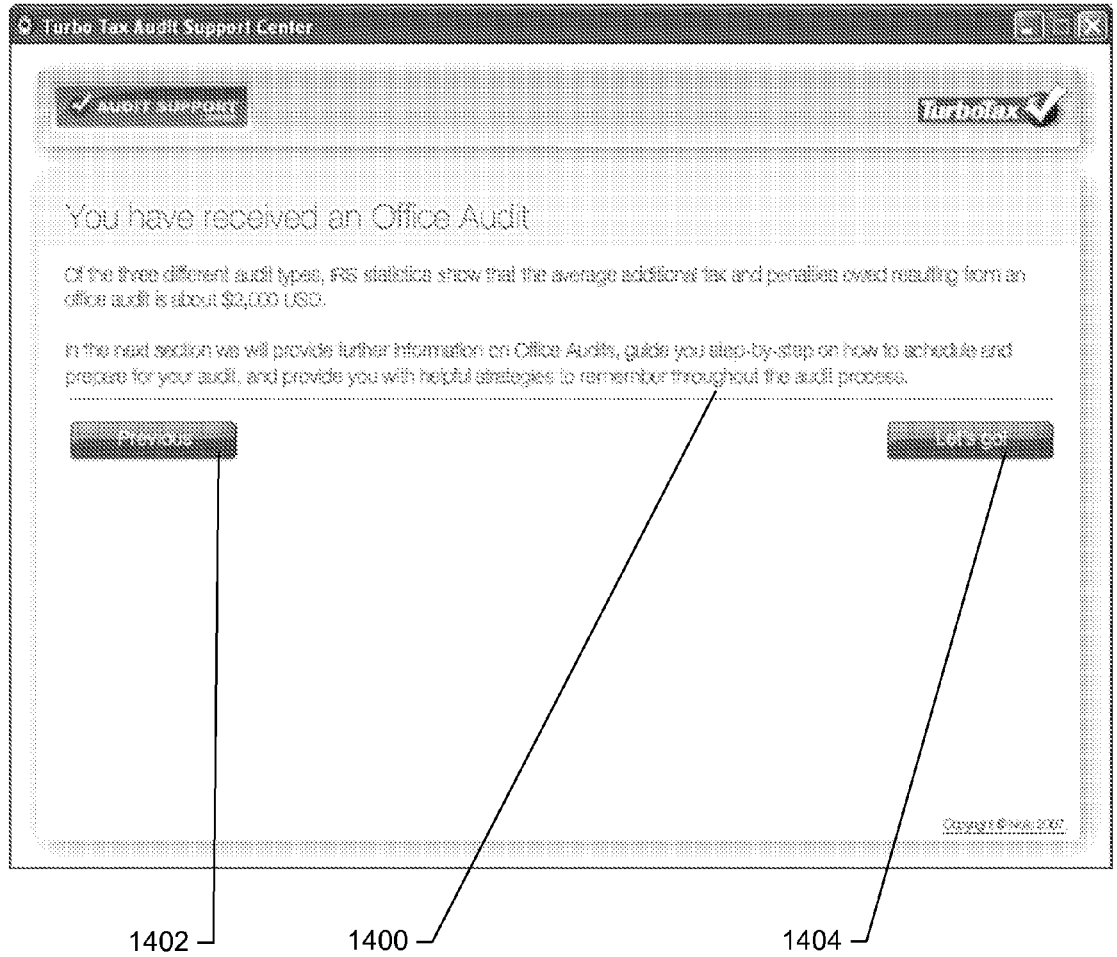

FIG. 14 shows a screenshot of an audit category description corresponding to the user selection and providing an additional confirmation questions. In this example, the audit category description (1400) displays additional information about the chosen audit category, namely the ease of dealing with this type of audit and the next steps that will occur in the audit support application. If the user determines that this is not the correct audit category, or they want to start over, they may select the button marked "Previous" (1402) to be directed back to the screen with the sample letter images (i.e. FIG. 11). If the user would like to continue to the next step, they may select the "Let's go!" button (1404) to reach the corresponding action items.

Figure 15:
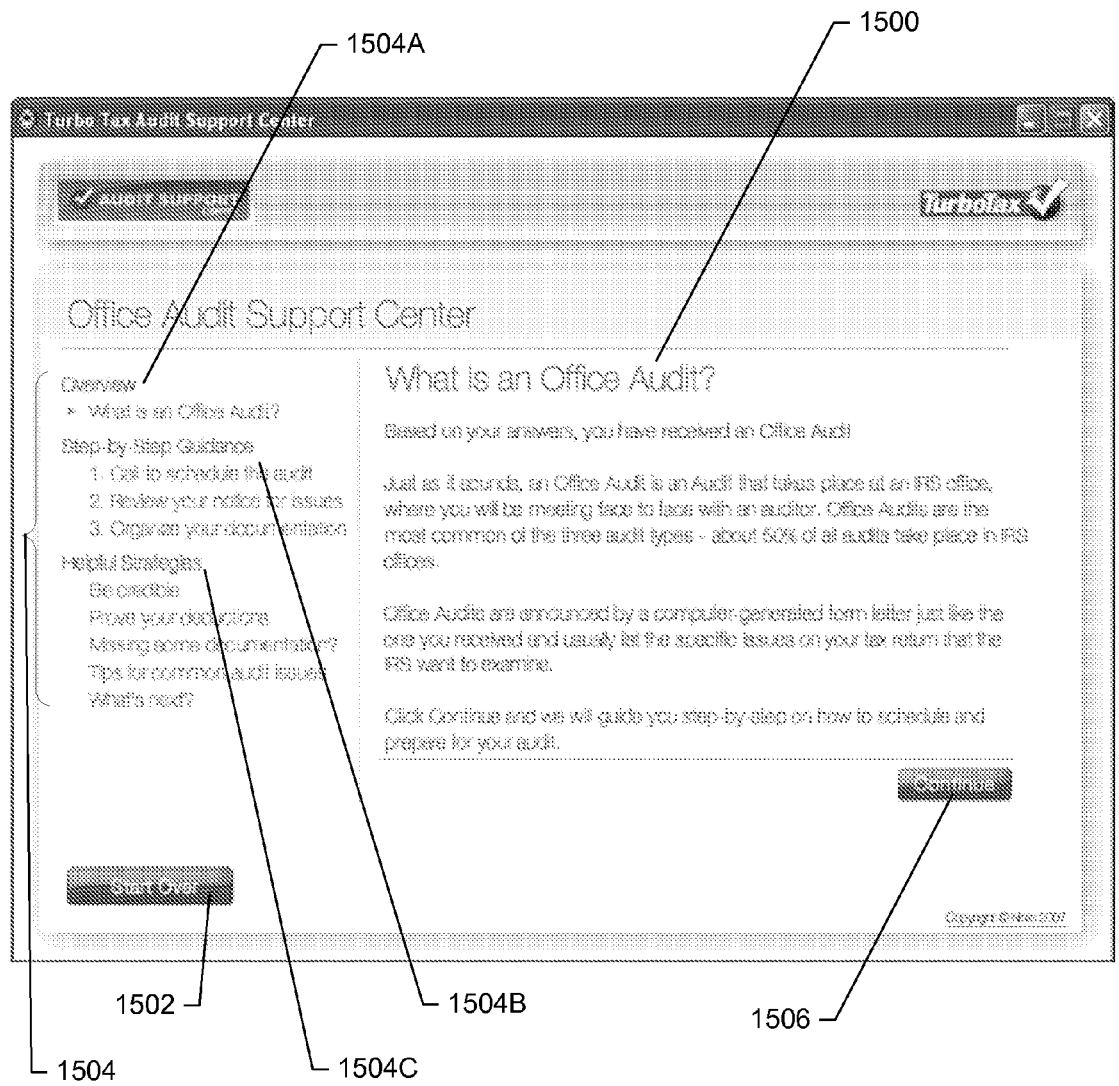

FIG. 15 shows a screenshot of action items associated with the user's selection. The action item list (1504) in this example provides additional information to the user corresponding with the audit category selected. For example, this screenshot shows the text presented to the user when they select the first action item in the action items list (1500). The user may proceed through the action items by selecting the "Continue" button (1506). In this example, the action items include an overview of the audit type (1504A), step-by-step guidance (1504B), and helpful strategies (1504C). The user may also select the "Start Over" button (1502) to return to the screen with the sample letter images (i.e. FIG. 11).

Figure 16:
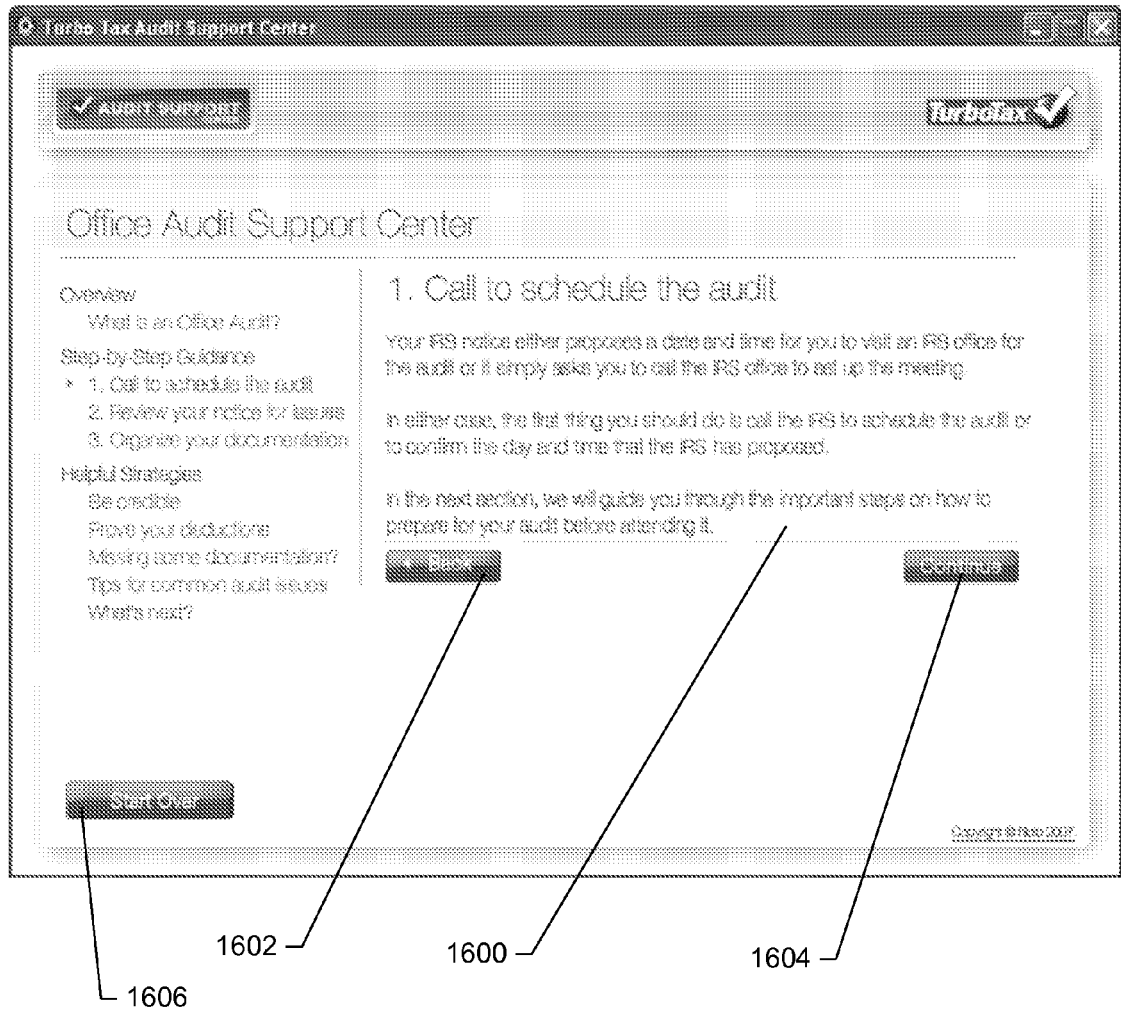

FIG. 16 shows a screenshot of an additional confirmation question. In this example, the user selected the "Continue" button from FIG. 15 to arrive at this screen. This is an example of the next step in the action item list (1504). This is the first step under the guidance section of the action items (1504B). The guidance (1600) indicates that the user may need to call and schedule an audit. This information is based on the user's original selection of the audit category (i.e. FIG. 12). As the user proceeds through the list of action items (1504), they may select the "Back" button (1602) to return to the previous screen (FIG. 15), they may select the "Continue" button (1604) to proceed to the next action item, or they may select the "Start Over" button (1606) to return to the screenshot of sample letter images (i.e. FIG. 11).

Those skilled in the art will appreciate that while the invention is described with respect to a tax audit, the invention (or portions thereof) may be extended to any type of audit. For example, the audit may be an audit performed by a private company or by a public entity and may include such varieties as a systems audit, a security audit, a financial audit, or a quality audit. The audit may evaluate a class of goods, an organization, individuals, processes, or projects. These are only a few examples of the types of audits for which the invention may be applicable. Those skilled in the art will appreciate that theses audits may take other forms.

The invention (or portions thereof), may be implemented on virtually any type of computer regardless of the platform being used. For example, the computer system may include a processor, associated memory, a storage device, and numerous other elements and functionalities typical of today's computers (not shown). The computer may also include input means, such as a keyboard and a mouse, and output means, such as a monitor. The computer system is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system may be located at a remote location and connected to the other elements over a network. Further, the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method for providing audit support comprising:
    displaying, using a user interface executing on a computer, a plurality of sample letter images representing layouts of a plurality of pre-existing audit letters sent by the Internal Revenue Service (IRS) for auditing tax returns, wherein each of the plurality of sample letter images is associated with one of a plurality of audit categories;
    receiving, using the user interface executing on the computer, a taxpayer selection of one of the plurality of sample letter images from a taxpayer to obtain a selected sample letter image;
    in response to the taxpayer selection, displaying a detailed sample letter image representing expanded content of one of the plurality of pre-existing audit letters and a first confirmation question corresponding to the selected sample letter image, wherein displaying the detailed sample letter image is performed using the user interface executing on the computer;
    receiving, using the user interface executing on the computer, a first response to the first confirmation question from the taxpayer based on data found within a taxpayer correspondence received from the IRS, wherein the first response confirms the taxpayer selection;
    displaying, using the user interface executing on the computer, a first audit category description corresponding to the one of the plurality of audit categories associated with the taxpayer selection; and
    displaying, using the user interface executing on the computer, an action item list associated with the taxpayer selection, wherein the action item list includes at least one action for the taxpayer to take to resolve a tax return audit described by the first audit category description.

2. The method of claim 1, wherein the first audit category description defines a complexity of responding to the audit.

3. The method of claim 1, further comprising:
    after displaying the first audit category description, displaying a second confirmation question, wherein the second confirmation question is associated with a sub-category of the one of the plurality of audit categories associated with the taxpayer selection;
    receiving a second response to the second confirmation question from the user, wherein the second response comprises a text code located on correspondence received from the IRS; and
    displaying, based on the second response, a second audit category description corresponding to a sub-category of the one of the plurality of audit categories associated with the taxpayer selection.

4. The method of claim 3, further comprising:
displaying, based on the second response, an action item list, wherein the action item list includes at least one action for the taxpayer to take in order to resolve the audit described by the second audit category description.

5. The method of claim 3, wherein the text code is one selected from a group consisting of a numeric sequence, an alpha-sequence, and an alpha-numeric sequence.

6. The method of claim 3, wherein the text code uniquely identifies the correspondence as associated with the sub-category of the one of the plurality of audit categories associated with the taxpayer selection.

7. The method of claim 1, wherein the first confirmation question requests the taxpayer to verify whether a sample layout of content in the detailed sample letter image corresponds to an actual layout of content in correspondence received from the IRS.

8. The method of claim 7, wherein the correspondence is an audit letter.

9. The method of claim 1, wherein the plurality of sample images are thumbnail images.

10. A computer-implemented method for receiving audit support, comprising:
viewing, within an audit support application executed via a processor, and in response to receiving a taxpayer correspondence from the Internal Revenue Service (IRS) regarding a tax return audit, a plurality of sample letter images representing layouts of a plurality of pre-existing audit letters sent by the IRS for auditing tax returns, wherein each of the plurality of sample letter images is associated with one of a plurality of audit categories;
selecting, by the taxpayer, one of the plurality of sample letter images to obtain a taxpayer selection comprising a selected sample letter image;
in response to the taxpayer selection, viewing a detailed sample letter image representing expanded content of one of the plurality of pre-existing audit letters and a first confirmation question corresponding to the selected sample letter image;
providing a first response to the first confirmation question based on data found within the taxpayer correspondence received from the IRS, wherein the first response confirms the taxpayer selection;
viewing a first audit category description corresponding to the one of the plurality of audit categories associated with the taxpayer selection;
viewing an action item list associated with the taxpayer selection, wherein the action item list includes at least one action for the taxpayer to take to resolve the tax return audit described by the first audit category description; and
performing the at least one action within the audit support application executed via a processor.

11. The method of claim 10, wherein the audit support application is web-based and wherein initiating the audit support application comprises accessing a website on which the audit support application is implemented.

12. The method of claim 10, wherein the audit support application is an executable file and wherein initiating the audit support application comprises downloading the executable file and executing the executable file.

13. The method of claim 10, wherein the first audit category description defines a complexity of responding to the audit.

14. The method of claim 10, wherein the first confirmation question requests the taxpayer to verify whether a sample layout of content in the detailed sample letter image corresponds to an actual layout of content in correspondence received from the IRS.

15. The method of claim 14, wherein the correspondence is an audit letter.

16. The method of claim 10, wherein the plurality of sample letter images are thumbnail images.

17. A computer readable medium comprising instructions executable on a processor for performing a method, the method comprising:
viewing, within an audit support application and in response to receiving a taxpayer correspondence from the Internal Revenue Service (IRS) regarding a tax return audit, a plurality of sample letter images representing layouts of a plurality of pre-existing audit letters sent by the IRS for auditing tax returns, wherein each of the plurality of sample letter images is associated with one of a plurality of audit categories;
selecting, by the taxpayer, one of the plurality of sample letter images to obtain a taxpayer selection comprising a selected sample letter image;
in response to the taxpayer selection, viewing a detailed sample letter image representing expanded content of one of the plurality of pre-existing audit letters and a first confirmation question corresponding to the selected sample letter image;
providing a first response to the first confirmation question based on data found within the taxpayer correspondence received from the IRS, wherein the first response confirms the taxpayer selection;
viewing a first audit category description corresponding to the one of the plurality of audit categories associated with the taxpayer selection;
viewing an action item list associated with the taxpayer selection, wherein the action item list includes at least one action for the taxpayer to take to resolve the tax return audit described by the first audit category description; and
performing the at least one action within the audit support application.

18. The computer readable medium of claim 17, further comprising instructions for:
after displaying the first audit category description, displaying a second confirmation question, wherein the second confirmation question is associated with a sub-category of the one of the plurality of audit categories associated with the taxpayer selection;
receiving a second response to the second confirmation question from the user, wherein the second response comprises a text code located on correspondence received from the IRS; and
displaying, based on the second response, a second audit category description corresponding to a sub-category of the one of the plurality of audit categories associated with the taxpayer selection.

19. The computer readable medium of claim 17, wherein the first confirmation question requests the taxpayer to verify whether a sample layout of content in the detailed sample letter image corresponds to an actual layout of content in correspondence received from the IRS.

20. The computer readable medium of claim 19, wherein the correspondence is an audit letter.

* * * * *